324-77.    SR 06-28-71    XR    3,588,460

United States Patent [11] 3,588,460

[72] Inventor Richard A. Smith
Morristown, N.J.
[21] Appl. No. 741,506
[22] Filed July 1, 1968
[45] Patented June 28, 1971
[73] Assignee Bell Telephone Laboratories, Incorporated
Murray Hill, N.J.

[54] FAST FOURIER TRANSFORM PROCESSOR
10 Claims, 3 Drawing Figs.

[52] U.S. Cl. .......... 235/156, 324/77
[51] Int. Cl. .......... G06f 7/38
[50] Field of Search .......... 235/152, 156; 307/29, 115; 340/167 (B), 147 (C), 147 (Sync.), 172.50; 324/77

[56] References Cited

UNITED STATES PATENTS 3,150,374 9/1964 Sunstein et al. .......... 340/147

FOREIGN PATENTS 1,045,203 10/1966 Great Britain .......... 307/29

OTHER REFERENCES

Cooley " An Algorithm For the Machine Calculation of Complex Fourier Series" MATH. OF COMP. Vol. 19, pp. 297— 301 Apr. 1965

*Primary Examiner*—Malcolm A. Morrison
*Assistant Examiner*—David H. Malzahn
*Attorneys*—R. J. Guenther and William L. Keefauver

ABSTRACT: Groups of consecutive samples from two separate channels are simultaneously processed in a cascade fast Fourier transform processor by appropriately connecting selected switches and delays to the computers of the processor.

INVENTOR
R. A. SMITH
BY R.O. Nimitz
ATTORNEY

FAST FOURIER TRANSFORM PROCESSOR

BACKGROUND OF THE INVENTION

This invention relates to data processing and, in particular, to the simultaneous calculation of the Fourier transform or the inverse Fourier transform of two selected sequences of data.

J. W. Cooley and J. W. Tukey in a paper entitled "An Algorithm for the Machine Calculation of Complex Fourier Series" published Apr. 1965 in Mathematics of Computation, Vol. 19, pages 297—301, outlined an efficient computation procedure for calculating the Fourier transform and the inverse Fourier transform of signal segments represented by sequences of samples. Known as the Cooley-Tukey algorithm, this procedure has led to the development of several special purpose computers. For example, U.S. Pat. application Ser. No. 605,791, filed Dec. 29, 1966, by G. D. Bergland and R. Klahn, and assigned to Bell Telephone Laboratories, the assignee of this invention, and patent application Ser. No. 605,768, filed Dec. 29, 1966, by M. J. Gilmartin and R. R. Shively now U.S. Pat. No. 3,517,173, and also assigned to Bell Telephone Laboratories, disclose several efficient computational systems which take advantage of certain computational simplicities of the Cooley-Tukey algorithm. In particular, the Bergland-Klahn application discloses a processor capable of calculating in real time the Fourier transforms of selected contiguous segments of a signal.

SUMMARY OF THE INVENTION

This invention provides yet another implementation of the Cooley-Tukey algorithm. According to this invention, by adding selected switches and delays to a sequence of efficient arithmetic units—which eliminate certain computational redundancies present in the algorithm— twice as may channels of data can be processed in real time as in the most efficient processor disclosed by Bergland and Klahn. No increase in either the quantity or speed of the processor's arithmetic units is required.

Now the Cooley-Tukey algorithm is based on a set of recurring or "recursive" equations. The first recursive equation describes how each of a set of samples—either real or complex—is to be operated upon and combined to yield a first set of new data. This first set of data, in turn, is operated upon as required by a second recursive equation to yield a second set of data. This second set of data, in turn, is operated upon in a manner described by a third recursive equation to yield a third set of data. The number of recursive equations in the set depends on the number of samples to be processed. For example, if the number of samples to be processed. For example, if the number of samples N equals $r^m$, $r$ and $m$ both being integers, $m$ recursive equations exist and $m$ recursive operations must be carried out. Each recursive operation consists of N similar calculations—including one multiplication and two algebraic summations—each calculation using $r$ pieces of data produced by the previous recursive operation. In calculating the Fourier transform of a set of real samples using the Cooley-Tukey algorithm, the final set of recursive operations yields the amplitudes and phases of the harmonically related frequency components representing the samples. Alternatively, in calculating the inverse Fourier transform, the final set of recursive operations yields the Fourier series representation of the processed samples.

Of significance, in the binary implementation of the fast Fourier transform —that is, when $r$=2—half of the N multiplications carried out in each recursive operation are redundant, differing from the remaining calculations only by a negative sign. This invention takes advantage of this redundancy to reduce computational effort and increase operating efficiency.

The processor of this invention, known as a cascade fast Fourier transform processor, is in one embodiment composed of a sequence of processing units, each unit containing a computer, selected switches and selected delays. Each computer has two input and two output leads. In carrying out each recursive operation of the Cooley-Tukey algorithm according to this invention, two independent sequences of input data either consisting of, or derived from, two independent sets of samples, are selectively switched from one input lead of the appropriate computer to the other input lead so as always to provide at the same time to the computer two pieces of data from the same sequence of input data for calculation. Data on one of the input leads and on one of the output leads are selectively delayed.

Then, in accordance with this invention, each pair of input data samples the computer is used to calculate two new pieces of data for use in the next recursive operation required by the Cooley-Tukey algorithm, rather than just one new piece of data. In essence, N pieces of data associated with a given signal segment require only N/2 calculations to yield N new pieces of data. If each calculation is made in one sample period, the computer in each recursive operation is used only half the time occupied by each incoming signal segment. Therefore the switches connecting the two independent channels of input data to the computer are operated so as to ensure, together with the delays, that data from one of the channels are available at each computer half the time occupied by the signal segment on that channel while data from the other channel are available at the computer the remaining time. This allows each computer to process twice as many pieces of data as in the prior art.

This invention will be more fully understood in light of the following detailed description taken together with the drawings.

DETAILED DESCRIPTION

The fast Fourier transform, hereinafter called the "FFT," results from the use of the Cooley-Tukey algorithm to calculate the Fourier transform or the inverse Fourier transform of discrete samples. The theory on which the FFT is based is fully described in the above-cited paper by Cooley and Tukey and, for example, in the June 1967 *IEEE Transactions On Audio And Electroacoustics*, Vol. AU-15.

In brief, the Cooley-Tukey algorithm defines a set of recursive operations to be carried out on a set of input data to yield a desired transformation. If the number of samples N being processed equals $2^m$, then, for the purposes of the algorithm, these samples are represented by the symbols $X_0(00...0)...X_0(11...1)$. In this case $m$ recursive operations must be performed to produce the Fourier transform or the inverse Fourier transform of these N input samples. The first recursive operation required by the Cooley-Tukey algorithm operates on the N input samples and is written as $$X_1(j_0, k_{m-2}, \ldots, k_0) = X_0(0, k_{m-2}, \ldots, k_0)W^0 + X_0(1, k_{m-2}, \ldots, k_0)W^{j_0 2^{m-1}} \quad (1)$$

where $j$ and $k$ assume the binary values 0 and 1, and $m = \log_2 N$. The second recursive operation operates on the N pieces of data $X_1(00...0)$ to $X_1(11...1)$ produced by the first recursive operation and is written as $$X_2(j_0, j_1, k_{m-3}, \ldots, k_0) = X_1(j_0, 0, k_{m-3}, \ldots, k_0)W^0 + X_1(j_0, l, k_{m-3}, \ldots, k_0)W^{j_1 2 + j_0 2^{m-2}} \quad (2)$$

The general recursive operation in the Cooley-Tukey algorithm for $r$=2 is written as $$X_p(j_0, \ldots, j_{p-1}, k_{m-p-1}, \ldots, k_0 = \sum_{k_{m-p}=0}^{1} X_{p-1}(j_0, \ldots, j_{p-2}, k_{m-p}, \ldots, k_0) \, w^{(j_{p-1}2^{q-1} + \ldots + j_0)k_{m-p}2^{m-p}} \quad (3)$$

where $p=m-1, m-2, \ldots, 0$.

In implementing the Cooley-Tukey algorithm for $m=3$, first, Equation (1) is applied to the $N=2^3$ or eight signal samples $X_0(000)$ through $X_0(111)$ to yield a first set of new data $X_1(000)$ through $X_1(111)$. Then Equation (2), the second recursive equation of the algorithm is applied to $X_1(000)$ through $X_1(111)$ to produce a second set of new date $X_2(000)$ through $X_2(111)$. Finally, Equation (3), with $p=3$, is applied to $X_2(000)$ through $X_2(111)$ to produce a third and final set of data $X_3(000)$ through $X_3(111)$ representing the required transformation of the samples $X_0(000)$ through $X_0(111)$.

Figure 1:
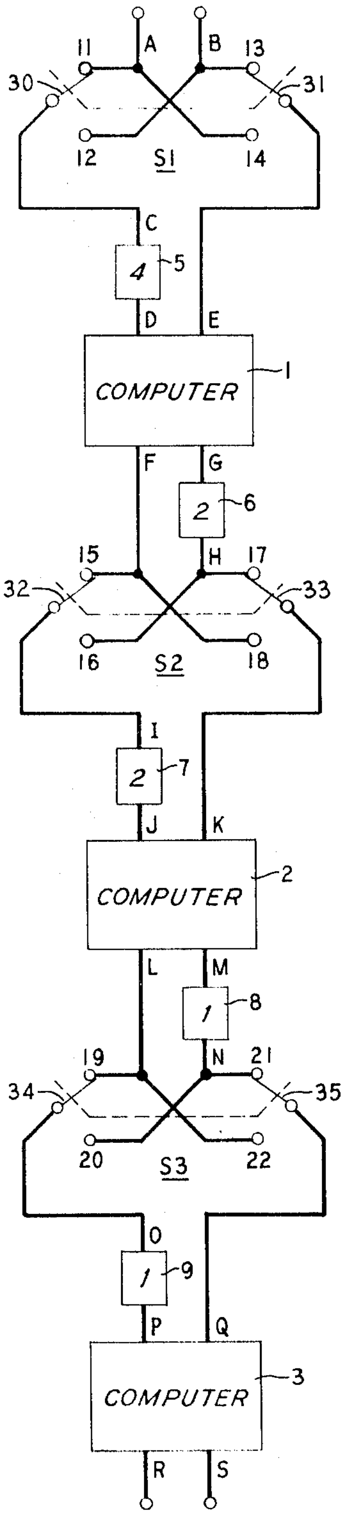
FIG. 1 is a schematic diagram of one embodiment of a cascade fast Fourier transform processor using the principles of this invention.

FIG. 1 shows one embodiment of this invention. For convenience in describing the operation of this embodiment it will be assumed that the Fourier transforms of consecutive groups of eight signal samples derived from two independent signals are being calculated, rather than the inverse Fourier transforms of these samples. Of course the inverse Fourier transform of groups of samples derived from two independent signals can also be calculated using the principles of this invention.

To described in detail the first recursive operation of the Cooley-Tukey algorithm, Equation (1) is expanded as shown below into Equations (1*a*) through (1*h*) for the case where the number N of input samples being processed is eight (i.e., $m=3$.

$X_1(000)=X_0(000)+X_0(100)$ (1*a*)

$X_1(001)=X_0(001)+X_0(101)$ (1*b*)

$X_1(010)=X_0(010)+X_0(110)$ (1*c*)

$X_1(011)=X_0(011)+X_0(111)$ (1*d*)

$X_1(100)=X_0(000)+X_0(100)e^{-\pi i}$ (1*e*)

$X_1(101)=X_0(001)+X_0(101)e^{-\pi i}$ (1*f*)

$X_1(110)=X_0(010)+X_0(110)e^{-\pi i}$ (1*g*)

$X_1(111)=X_0(011)+X_0(111)e^{-\pi i}$ (1*h*)

The arguments of the X terms are in binary notation. For convenience in describing the operation of this invention with aid of FIG. 3, the consecutive groups of eight samples on input leads A and B (FIG. 1) will be referred to in FIG. 3 by decimal numbers 1 2...8 and 1 2...8, respectively. The groups of eight samples on lead B of FIG. 1 are shown on row B of FIG. 3 offset by four data samples from the groups of eight input samples on lead A of FIG. 1. While the decimal numbers 1 2 3...8 are repeated periodically on both rows A and B of FIG. 3, it should be understood that these numbers do not represent the same group of eight samples periodically repeated, but rather represent consecutive groups of eight samples from two simultaneously occurring signals. Furthermore, as new data is produced by each recursive operation of the Cooley-Tukey algorithm, this new data will adapt the decimal notation of the input data or samples or samples from which it is derived.

In FIG. 1 the leads labeled A and B carry samples derived from two signals. Lead A supplied a stream of consecutive samples derived from a first signal while lead B supplied a stream of samples derived from a second signal. These samples are, for example, derived by well-known sampling apparatus from two signals, stored in an auxiliary store (not shown), and then presented to the cascade FFT processor shown in FIG. 1 at a rate compatible with the computing speed of this processor.

Initially, switch 30 is in contact with node 11 and switch 31 is in contact with node 13. As a result, the stream of samples on lead A, denoted on row A of FIG. 3 by the decimal notation 1 2...8 1 2...8 is initially transmitted to 4-sample delay 5. Likewise, the samples on lead B, shown on row B of FIG. 3 by the underlined decimal notation 1 2...8 1 2...8 are sent by switch 31 directly to computer 1. The step-like function shown at the top of FIG. 3 denotes the positions with time, measured in sample periods, of switches 30 and 31, which together comprise switch unit S1. Because switches 30 and 31 are initially "up," that is, in contact with nodes 11 and 13, this step function is initially up. But in accordance with this invention, switches 30 and 31, for the case where consecutive groups of eight samples of input data are analyzed, are changed from contact with nodes 11 and 13, respectively, to contact with nodes 12 and 14, respectively, after the fourth sample on lead A has entered delay 5.

Thus, the fifth sample on lead A, rather than going to delay 5, goes directly through switch 31 to computer 1. The samples on lead B then go through switch 30 to delay 5 and fill delay 5 while computer 1 is processing pairs of samples from lead A. Thus delay 5 is always occupied completely with samples from either lead A or lead B or both.

Figure 3:
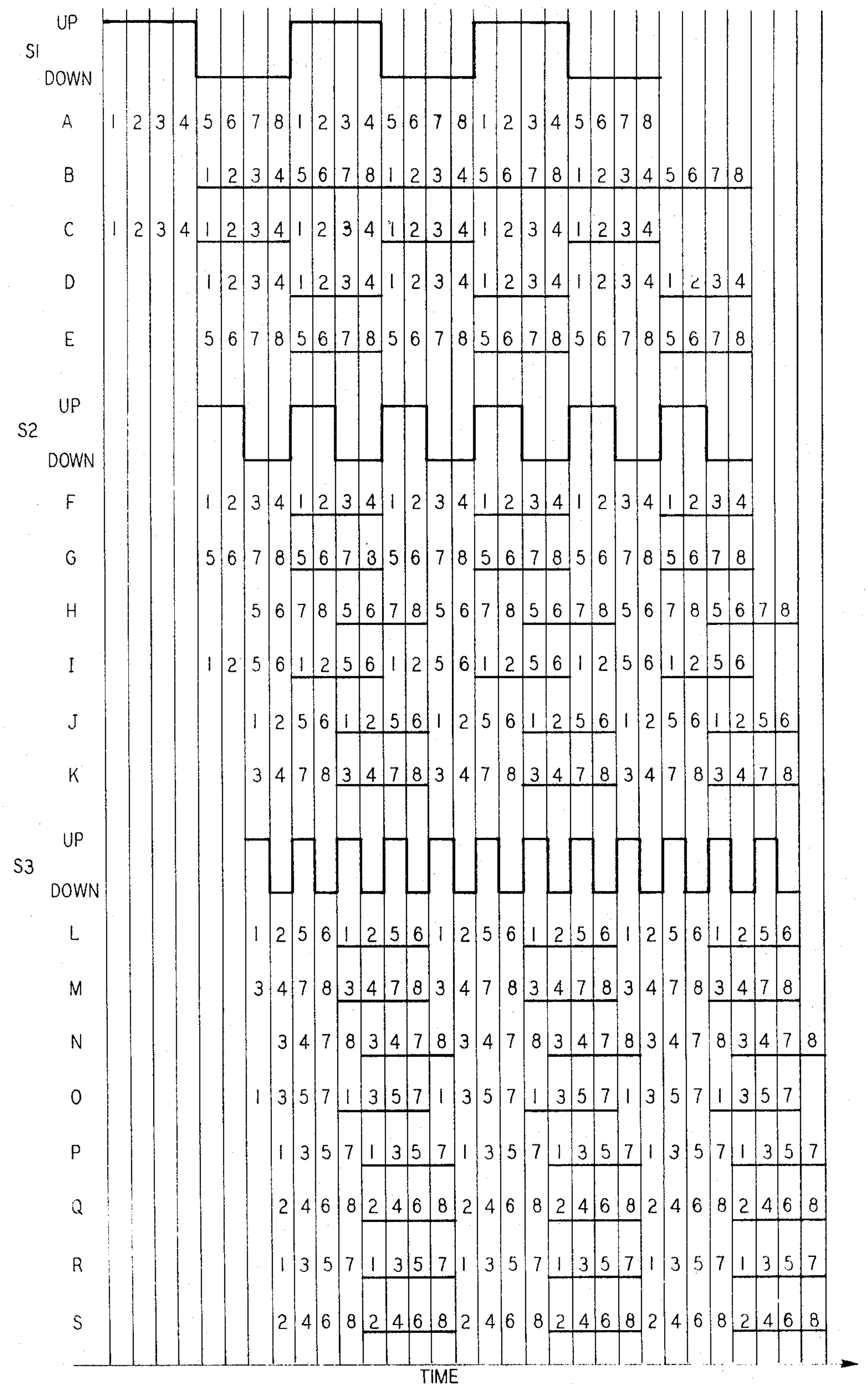
FIG. 3 relates the operation of the switches in FIG. 1 to the distribution of data at selected points in FIG. 1.

As a result, computer 1 now receives simultaneously the first and the fifth samples on lead A, denoted by $X_0(000)$ and $X_0(100)$ in Equations (1*a*) and (1*e*) (or by the decimal notation 1 and 5 in FIG. 3). Computer 1 thus begins computing the new data required by Equations (1*a*) through (1*h*). As shown by Equation (1*a*), the first and fifth samples on lead A, denoted by $X_0(000)$ and $X_0(100)$, respectively, are used to compute the first piece of new data $X_1(000)$ and the fifth piece of new data $X_1(100)$. (Note that in this specification the numerical designation of a piece of data is determined by its argument in the appropriate recursive equation, and not by the order in which it is calculated.)

However, as shown by Equation (1*e*), the fifth piece of new data is a function of the product $X_0(100)e^{-\pi i}=-X_0(100)$ which differs from the piece of data $X_0(100)$ required by Equation (1*a*) only by a minus sign. Therefore computer 1 calculates simultaneously $X_1(000)$ and $X_1(100)$ from the same two pieces of input data by using a subtracting rather than an adding circuit to produce $X_1(100)$. As shown in FIG. 3 on the lines labeled F and G, line F contains the first piece of new data $X_1(000)$ (labeled 1 on line F) produced by the first recursive operation and line G contains the fifth piece of data $X_1(100)$ (labeled 5 on line G) produced by the first recursive operation.

Likewise, the second and the sixth samples $X_0(001)$ and $X_0(101)$ are, as shown by Equations (1*b*) and (1*f*), operated on in computer 1 to produce the second and the sixth piece of data $X_1(001)$ and $X_1(101)$, respectively, (labeled 2 and 6 on lines F and G, respectively, of FIG. 3) generated by the first recursive operation of the Cooley-Tukey algorithm. FIG. 3 shows that these two new pieces of data likewise appear simultaneously on leads F and G of computer 1 (FIG. 1).

In a similar way the third and seventh samples on lead A, $X_0(010)$ and $X_0(110)$, respectively (shown on lines D and E of FIG. 3 to enter computer 1 simultaneously), produce the third and seventh samples $X_1(010)$ and $X_1(110)$ (denoted 3 and 7 on leads F and G of FIG. 3, respectively). Similarly the fourth and eighth input samples on lead A, $X_0(011)$ and $X_0(111)$, produce the fourth and eighth samples, $X_1(011)$ and $X_1(111)$, on leads F and G, respectively.

Now that computer 1 has completed the first recursive operation specified by Equations (1*a*) through (1*h*) on the first group of eight samples from lead A, first group of eight samples from lead B is similarly processed by computer 1 as described above. Meanwhile, switches 30 and 31 have returned to the "up" position and delay 5 is being loaded with the first four samples from the second group of eight samples on lead A in preparation for a similar processing by computer 1 of this group of samples.

Now the output data on lead G enters 2-sample delay 6. The output data on lead F and from delay 6 are then distributed by switch unit S2 comprising switches 32 and 33, to the proper input leads of computer 2, preparatory to the carrying out, by this computer, of the calculations required by the second recursive equation of the Cooley-Tukey algorithm.

According to the second recursive equation of the Cooley-Tukey algorithm, reproduced in detail below as Equations (2*a*) through (2*h*), date produced by the first recursive operation is operated upon to produce a second set of data.

$X_2(000)=X_1(000)+X_1(010)$ (2*a*)

$X_2(001)=X_1(001)+X_1(011)$ (2*b*)

$X_2(010)=X_1(000)+X_1(010)e^{-\pi i}$ (2*c*)

$X_2(011)=X_1(011)+X_1(011)e^{-\pi i}$ (2*d*)

$X_2(100)=X_1(100)+X_1(110)e^{-\pi i/2}$ (2*e*)

$$X_2(101)=X_1(101)+X_1(111)\,e^{-\pi i/2} \quad (2f)$$

$$X_2(110)=X_1(100)+X_1(110)\,e^{-\frac{3\pi i}{2}} \quad (2g)$$

$$X_2(111)=X_1(101)+X_1(111)\,e^{-\frac{3\pi i}{2}} \quad (2h)$$

As shown by Equation (2*a*), the first and third pieces of data, $X_1(000)$ and $X_1(010)$, respectively, produced by the first recursive operation, are used to produce the first and third new pieces of data, $X_2(000)$ and $X_2(010)$, respectively, generated by the second recursive operation. However, the output data from computer 1 initially consists of the first and fifth pieces of data, $X_1(000)$ and $X_1(100)$, respectively, generated by the first recursive operation. Thus, the data on lead F is transmitted through switch 32 to 2-sample delay 7.

As shown in FIG. 3 by the step function labeled S2, switches 32 and 33 remain in the "up" position contacting nodes 15 and 17 for the time taken by computer 1 to produce two new pieces of data on each of its output leads. Then switches 32 and 33 are moved to the "down" position in contact with nodes 16 and 18, respectively. Immediately after this move, leads F and G contain $X_1(010)$ and $X_1(110)$, the third and seventh pieces of data respectively, produced by the first recursive operation. The third piece of data $X_1(010)$ is sent by means of switch 33 directly to the input of computer 2 and arrives at lead K of computer 2 just as $X_1(000)$, the first piece of data from computer 1 arrives at lead J of computer 2. As shown by Equations (2*a*) and (2*c*), these two pieces of data, $X_1(000)$ and $X_1(010)$, are then used to calculate in computer 2 the first and third pieces of data $X_2(000)$ and $X_2(010)$, respectively, (shown on lines L and M of FIG. 3 as 1 and 3, respectively) produced by the second recursive operation of the Cooley-Tukey algorithm.

As shown by Equation (2*b*), the second and the fourth pieces of data from computer 1, $X_1(001)$ and $X_1(011)$, respectively, are used to calculate the second and the fourth pieces of data $X_2(001)$ and $X_2(011)$ produced by the second recursive operation of the Cooley-Tukey algorithm. The simultaneous time relationship between these four pieces of data is shown on lines J and K, and L and M of FIG. 3.

The operation of computer 2 on the remaining pieces of data from computer 1 is essentially the same. Delays 6 and 7 operate in conjunction with switches 32 and 33 in such a manner that each pair of input data to computer 2 is operated upon in computer 2 to produce an identically designated pair of output data from computer 2. Lines J and K, and L and M of FIG. 3 show this correspondence.

Switching unit S3 comprises switches 34 and 35, initially in contact with nodes 19 and 21. As shown by the step function labeled S3 in FIG. 3, switches 34 and 35 alternate at the sampling rate from the "up" to the "down" to the "up" to the "-down"...etc. position. Thus when the first and third pieces of data $X_2(000)$ and $X_2(010)$ (labeled respectively 1 and 3 on lines L and M of FIG. 3) produced by the second recursive operation leave computer 2, the data $X_2(000)$ is passed through switch 34 to 1-sample delay 9. On the other hand, the third piece of data $X_2(010)$ is stored in 1-sample delay 8 for the period of one sample. Then switches 34 and 35 are moved to the "down" position in contact with nodes 20 and 22, respectively. Thus, when the third piece of data $X_2(010)$ leaves delay 8 it is transmitted through switch 34 to 1-sample delay 9. Meanwhile, the first piece of data $X_2(000)$ from computer 2 on lead L has left delay 9 and is on input lead P to computer 3. At the same time the second piece of data $X_2(001)$ (labeled 2 on line L of FIG. 3) to leave computer 2 on lead L is transmitted through switch 35 to input lead Q of computer 3. Thus, the first two pieces of data produced by the second recursive operation, to be operated on by computer 3 in the third recursive operation of the Cooley-Tukey algorithm are $X_2(000)$ and $X_2(001)$.

Equations (3*a*) through (3*h*) show the operations required by the third recursive equation of the Cooley-Tukey algorithm on the data produced by computer 2.

$$X_3(000)=X_2(000)+X_2(001) \quad (3a)$$

$$X_3(001)=X_2(000)+X_2(001)\,e^{-2\pi i(1/2)} \quad (3b)$$

$$X_3(010)=X_2(010)+X_2(011)\,e^{-2\pi i(1/4)} \quad (3c)$$

$$X_3(011)=X_2(010)+X_2(011)\,e^{-2\pi i(3/4)} \quad (3d)$$

$$X_3(100)=X_2(100)+X_2(101)\,e^{-2\pi i(1/8)} \quad (3e)$$

$$X_3(101)=X_2(100)+X_2(101)\,e^{-2\pi i(5/8)} \quad (3f)$$

$$X_3(110)=X_2(110)+X_2(111)\,e^{-2\pi i(3/8)} \quad (3g)$$

$$X_3(111)=X_2(110)+X_2(111)\,e^{-2\pi i(7/8)} \quad (3h)$$

Now as shown by Equations (3*a*) and (3*b*) the data $X_2(000)$ and $X_2(001)$ produced by computer 2 (labeled 1 and 2 on lines P and Q of FIG. 3) are used in computer 3 to calculate the first two pieces of data $X_3(000)$ and $X_3(001)$ (labeled 1 and 2 on lines R and S of FIG. 3) produced by the third recursive operation of the Cooley-Tukey algorithm.

The generation of the remaining third through eighth pieces of data $X_3(010)$ through $X_3(111)$ by computer 3 from the corresponding pieces of data produced by computer 2 can be traced by following these eight pieces of data through the relative data locations shown in FIG. 3.

Thus, after the first and second pieces of data generated by computer 2 have been used in computer 3 to generate the first and second pieces of data produced by the third recursive operation of the Cooley-Tukey algorithm, the third piece of data produced in computer 2 leaves 1-bit delay 9. This piece of data is passed into computer 3 on lead P just as the fourth piece of data produced by computer 2 passed from delay 8 through switch 35 to input lead Q of computer 3. Computer 3 then produces from these two pieces of data the third and fourth pieces of data generated by the third recursive operation of the Cooley-Tukey algorithm.

The above-described process continues indefinitely so long as input data continues to enter the processor on leads A and B.

Figure 2:
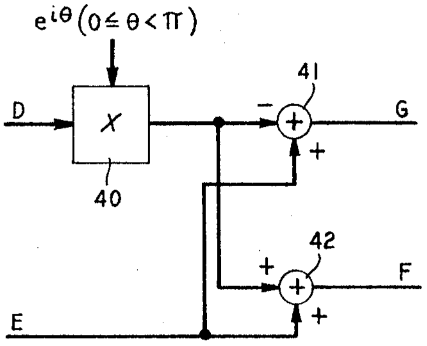
FIG. 2 is a schematic block diagram of a computer for use in this invention.

FIG. 2 shows an arithmetic unit appropriate for use in any of the computers of this invention. For convenience in explanation, it will be assumed that this arithmetic unit constitutes computer 1. The input and output leads are thus labeled D, E, F and G to correspond to the leads on computer 1. The input data on lead D is multiplied by $e^{i\theta}$ in product generator 40 where Θ is determined by the appropriate recursive equation. The resulting product is added to the input data to computer 1 on lead E in network 42 and is subtracted from this input signal in network 41. The resulting output signals on leads F and G represent the appropriate pieces of data specified by the recursive equations of the Cooley-Tukey algorithm.

From the above description of the operation of this invention, it is apparent that it is the arrangement and operation of the switches and delays shown in FIG. 1 in cooperation with the efficient arithmetic unit of FIG. 2 or its equivalent that makes possible the simultaneous processing of consecutive groups of samples from two input channels as shown in FIG. 1. The operation of this invention is such that except for an initial startup period, each delay and each computer in FIG. 1 is used full time.

While this invention has been described for the case where the number of samples on each input lead equals eight, implementations for the case where the number of samples N equals $2^m$ are obvious in view of this disclosure.

I claim:

1. Apparatus for simultaneously calculating the Fast Fourier Transform of two sequences of data which comprises:
   - a plurality of serially connected processing units, each unit including;
   - a computer containing two input and two output leads, for computing simultaneously two new pieces of data from each pair of input data;
   - switching means for shunting pairs of input data selected or derived from one or the other of said two sequences of data, to the input leads of said computer, according to a predetermined strategy;
   - a first selected delay in the first input lead of said computer; and
   - a second selected delay in the second output lead of said computer.

2. Apparatus as in claim 1 in which said second selected delay is one half said first selected delay except in the last serially connected processing unit in which said second selected delay is zero.

3. Apparatus as in claim 1 in which said switching means comprise two switches for sending selected data to said first selected delay while simultaneously sending other selected data to the second input lead to said computer, in accordance with a predetermined strategy.

4. Apparatus for generating signals representing Fourier series coefficients corresponding to each of a plurality, $m$ of input sequences of data signals, each of said sequences comprising N data signals, said apparatus comprising a plurality, K, of processing units, the $i$th of said processing units, $i=1, 2,\ldots,K$ comprising:

1. a computer comprising $m$ input leads and $m$ output leads for forming at each of said $m$ output leads a set of $N/m$ output data signals for each of $m$ sets of N signals selectively applied at said $m$ input leads, said computer thereby forming a set of N output signals for each corresponding set of N signals applied at said input leads, and
2. means for distributing subsets of each of the $m$ sets of N output signals from the $(i\text{-}1)$th unit to selected ones of said $m$ input leads, said $m$ input sequences comprising the $m$ sets of signals applied at the input leads of the first unit.

5. The apparatus of claim 4 wherein said computer comprises means for forming as each of said set of N output signals N Fourier series coefficients based on selected ones of said corresponding set of N signals applied at said input leads.

6. The apparatus of claim 5 wherein said means for distributing subsets comprises a store capable of storing at least a subset of said $N/m$ data signals, and switching means for selectively applying data signals from one or more of said output leads from said $(i\text{-}1)$th unit to selected ones of said $m$ input leads at said $i$th unit.

7. The apparatus of claim 6 wherein said switching means comprises (1) means for applying a first subset of said $N/m$ data signals from a given output lead of said $(i\text{-}1)$th unit to said store, (2) means for subsequently reading said first subset of said $N/m$ data signals from said store and applying them to a first predetermined set of said input leads, and (3) means for reading a second subset of said $N/m$ data signals from said given output lead of said immediately preceding unit and applying them to a second predetermined set of said input leads.

8. Apparatus according to claim 7 wherein said means for forming said output signals comprises (1) a source of trigonometric function signals, (2) means for forming product signals corresponding to the product of selected ones of said trigonometric function signals and selected ones of said signals applied at said input leads, and (3) means for forming signals representing the signed sum of selected ones of said product signals and selected ones of said signals applied at said input leads.

9. The apparatus according to claim 6, wherein $m=2$, $N=2^K$, and said subsets each comprise N/2 data signals.

10. The apparatus according to claim 8 wherein $m=2$, $N=2^K$, and said subsets each comprise N/2 data signals.